United States Patent [19]

Kanayama et al.

[11] 4,345,286
[45] Aug. 17, 1982

[54] POWER SUPPLY DEVICE FOR A MULTIFUNCTION APPARATUS HAVING A PLURALITY OF POWER SOURCES

[75] Inventors: Katsumi Kanayama; Kenzi Furuta; Kazuyasu Motoyama, all of Hachioji, Japan

[73] Assignee: Olympus Optical Co., Ltd., Tokyo, Japan

[21] Appl. No.: 136,447

[22] Filed: Apr. 2, 1980

[30] Foreign Application Priority Data

Apr. 10, 1979 [JP] Japan .................... 54/43291

[51] Int. Cl.³ ............................. G11B 23/00
[52] U.S. Cl. .................... 360/137; 307/18; 307/64
[58] Field of Search ............. 360/137; 307/18, 19, 307/64; 346/20

[56] References Cited

U.S. PATENT DOCUMENTS

| | | | |
|---|---|---|---|
| 389,935 | 9/1888 | McDonald | 307/19 |
| 3,059,185 | 10/1962 | Krugman | 307/19 X |
| 3,562,441 | 2/1971 | Bretschneider | 307/137 X |
| 3,818,237 | 6/1974 | Straus | 307/18 X |
| 4,003,093 | 1/1977 | Satoh | 360/137 |
| 4,208,686 | 6/1980 | Sato et al. | 346/20 X |

Primary Examiner—Stuart N. Hecker
Attorney, Agent, or Firm—Frishauf, Holtz, Goodman & Woodward

[57] ABSTRACT

A tape recorder with electronic counter having a counter portion (14) furnished with power from a first battery (18) and serving to display the extent of tape drive, a tape recorder portion (20) furnished with power from a second battery (22) and switched from one operation mode over to another according to the count value in the counter portion (14) and a switch (17) for permitting the power supply to the counter portion (14) from the second battery (22) when the counter portion (14) becomes inoperative with the exhaustion of the first battery (18).

5 Claims, 4 Drawing Figures

POWER SUPPLY DEVICE FOR A MULTIFUNCTION APPARATUS HAVING A PLURALITY OF POWER SOURCES

BACKGROUND OF THE INVENTION

This invention relates to a multifunction apparatus with a plurality of power sources, and more particularly to a tape recorder with an electronic counter, in which a counter section and a tape recorder section are furnished with power independently of each other from respective batteries.

To date, portable tape recorders provided with a clock which also serves as a tape counter are marketed. In such portable tape recorders, the switching between a clock function and a tape counter function is usually done by changing a clock signal source and a carry timing. When the clock is used as such, the clock signal source used is a crystal oscillator operating at a predetermined frequency, and a 60th scale and duodecimal systems are used; at the time of the use as a tape counter the clock signal source is changed by a Hall element or the like producing pulses according to the rotation of the tape reel, and a decimal system is used. The clock, which also serves as tape counter, comprises a C-MOS LSI and a liquid crystal display unit, and its power consumption is very low. Usually, the service life of the battery used for the counter/clock section is very long, mostly longer than one year. On the other hand, the life of the battery used for a tape recorder section is relatively short; in case of a manganese battery or alkaline battery the life is slightly longer than ten hours when the battery is continuously used and a couple of weeks when the battery is used for one hour per day. Therefore, in case where the counter/clock section is furnished with power from the battery of the tape recorder section, the operation of the counter/clock section can be continued only for several weeks at the most. Also, when the power supply to the clock section is stopped, right time display can no longer be obtained. This means that when the counter/clock section is furnished with power from the battery for the tape recorder section, it is necessary to make correction of the time display in the clock section at an interval of several weeks or a shorter interval. This is very cumbersome.

Due to the above, it has been the practice to supply power to the counter/clock section and tape recorder section from respective batteries which are independent of each other. However, the difference in service life between these two independent batteries is posing a problem as described below.

In case of, for instance, a tape recorder having a memory stop function, the memory stop is effected in the following way. A predetermined numerical data value, for instance "0000" is initially set in the counter section. When the tape is run afterwards until the count data in the counter section goes from "9999" to "0000," a timing signal (i.e., carry-out signal) is delivered from the counter section to the tape recorder section, whereupon the operation mode of the tape recorder section is switched to stop the tape. It will be seen that in this tape recorder, in which the operation mode of the tape recorder section is governed by the counter section, if the counter/clock section becomes inoperative the normal operation of the tape recorder section can no longer be obtained. In other words, if the battery for the counter/clock section is exhausted, the function of the tape recorder section is inhibited even though the battery for the tape recorder section may be new or have much lifetime left. In this case, the tape recorder can not be normally used unless the battery for the counter/clock section is replaced. However, since the battery for the counter/clock section has a long life, the time of its replacement is likely to be forgotten, and in many cases no spare battery is provided.

SUMMARY OF THE INVENTION

The object of the invention is to provide a tape recorder with an electronic counter, in which the counter section can be furnished with power from the battery for the tape recorder section in the case when the battery for the counter section is exhausted.

To achieve the above object, a device, such as a tape recorder with an electronic counter, according to the invention is provided with a switch for switching the power supply from the battery for the tape recorder section to the counter section.

With this tape recorder with an electronic counter, the counter section can be continually operated with power furnished from the battery for the tape recorder section even in the event where the battery for the counter section is exhausted and there is no spare battery for the counter section. At this time, the battery for the tape recorder section may be thought to last for several hours or several days or more, and during this period a spare battery for the counter section can be prepared.

DETAILED DESCRIPTION OF THE PREFERRED EMBODIMENTS

Figure 1:
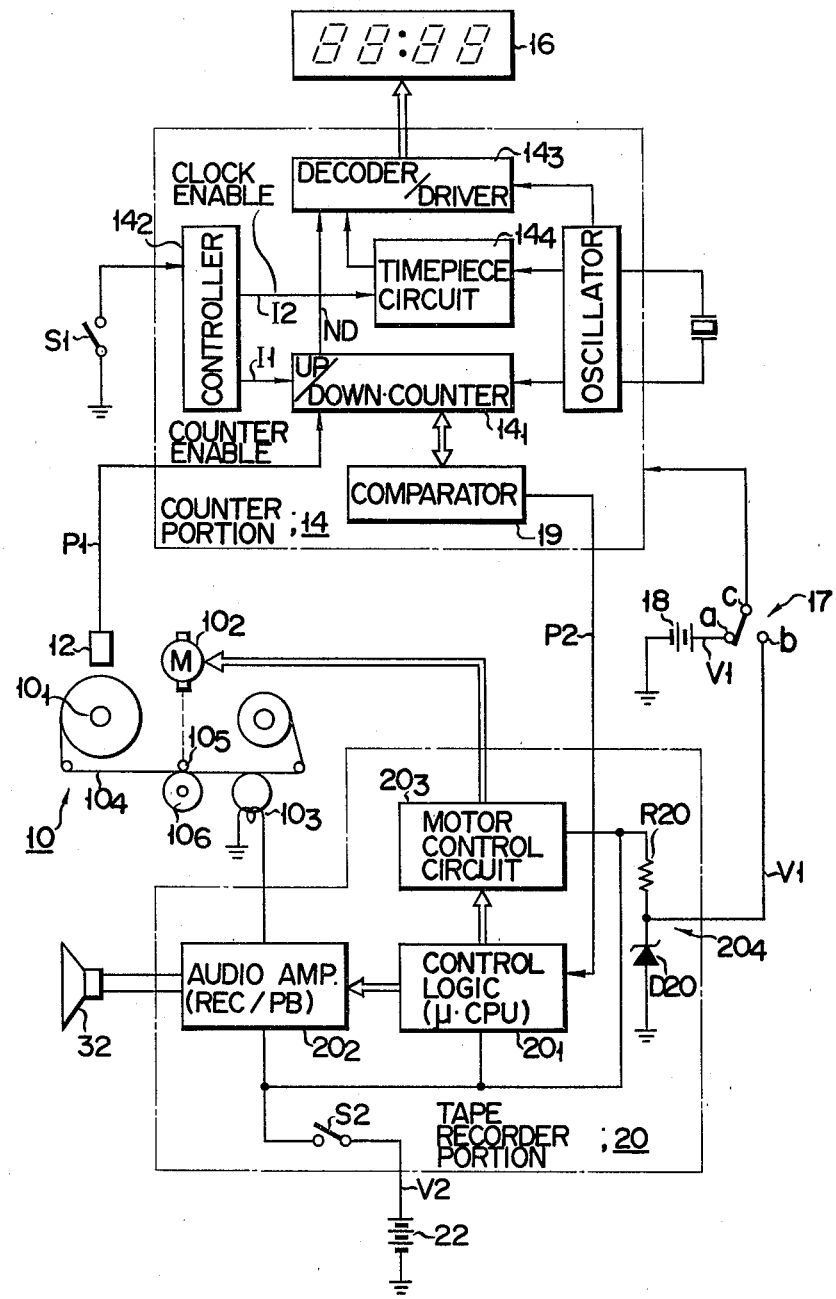
FIG. 1 is a schematic representation of the circuit of an embodiment of the tape recorder with an electronic counter according to the invention.

For the sake of brevity of the description, like parts in the drawings are designated by like reference numerals, and repetition of description is avoided.

Figure 2:
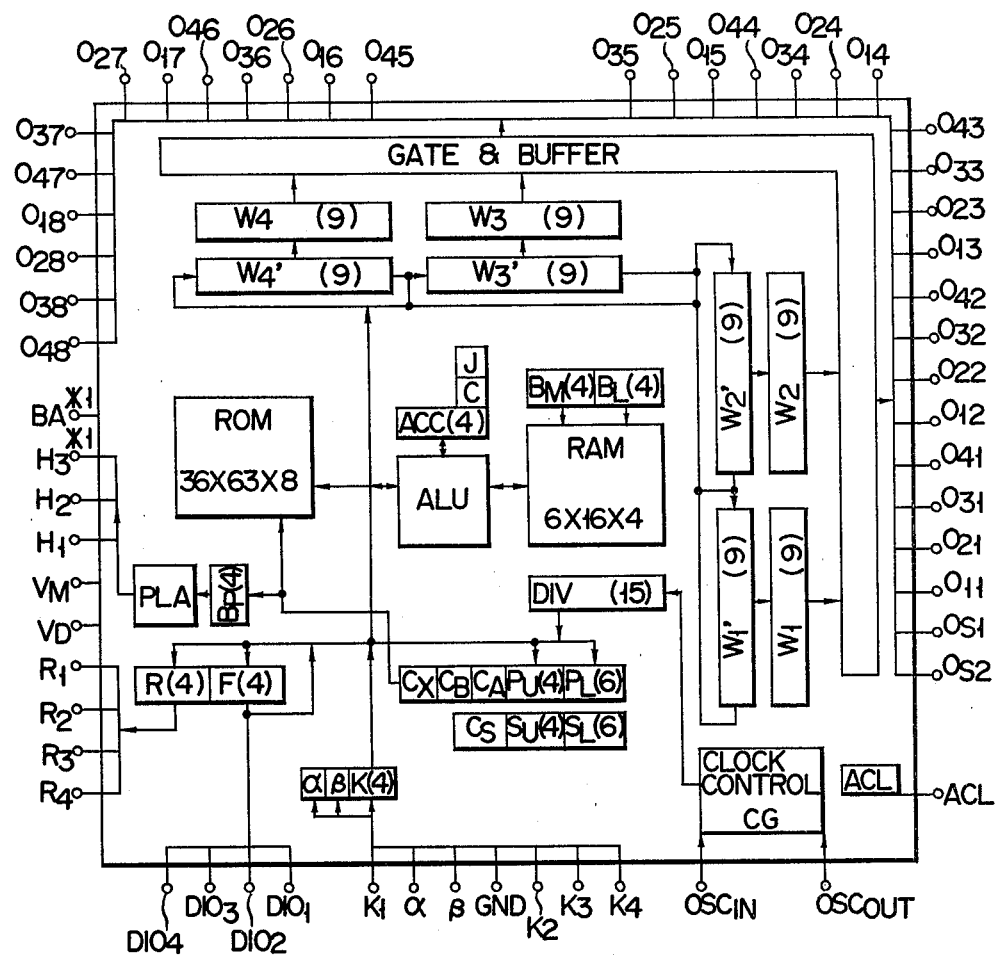
FIG. 2 is a block diagram showing the circuit construction of a conventional microcomputer which can be employed for a controller $14_2$ or a control logic $20_1$ shown in FIGS. 1 and 3.

FIG. 1 shows the circuit construction of an embodiment of a tape recorder with an electronic counter according to the invention. A pulse generator 12 is disposed on the side of a take-up reel $10_1$ of a tape transport mechanism 10. This pulse generator 12 may, for instance, be a Hall element and supplies pulses $P_1$ corresponding in number to the r.p.m. of the take-up reel $10_1$, to which a magnet is coupled, or to the number of times of the magnetic field change to an up/down counter $14_1$ of a counter/clock portion 14. When the counter $14_1$ is enabled by a logic "1" of an instruction I1 coupled to it from a controller $14_2$, it counts the pulses P1 and gives the count number data ND to a decoder/driver $14_3$. The count number data ND, which corresponds to the amount of the paid-off or taken-up tape, i.e., the extent of tape drive, is supplied through the decoder/driver $14_3$ to a liquid crystal display panel 16. Thus, a numerical value corresponding to the extent of tape drive is displayed on the display panel 16. On the other hand, when a timepiece circuit $14_4$ is enabled by a logical "1" of an instruction I2 which is produced from the controller $14_2$ with a display select switch S1 turned "on" (or "off"), the time is displayed on the display panel 16. In other words, either tape drive extent or elapsed time can be displayed on the display panel 16 with switching of the switch S1. The counter/clock portion 14 and a comparator 19 which will be described later can be furnished with power from a first battery 18 through contacts a and c of a switch section 17. As the first battery 18 a mercury dry cell is usually used. The controller $14_2$ may be constructed with a conventional logic gate circuit or flip-flop to produce the instructions I1="1" and I2="0" when the switch S1 is "off" and produce the instructions I1="0" and I2="1" when the switch S1 is "on." In the present embodiment, however, a C-MOS microcomputer model SM-4 of Sharp Co. in Japan, as shown in FIG. 2, is used as the controller $14_2$ for providing various functions thereto. It is also possible to use a 8048/8748 type microcomputer of Intel Co. in the U.S.A. in lieu of the device shown in FIG. 2. U.S. Pat. Nos. 3,107,343 and 4,122,498 disclose examples of the prior-art system or apparatus which uses such a microcomputer or control logic.

The count number data from the up/down counter $14_1$ is supplied to the comparator 19 and compared there with a predetermined value preset there. When the count number value and preset value coincide, the comparator 19 produces a timing signal P2, which is coupled to a control circuit $20_1$ in a tape recorder portion 20. The control circuit $20_1$ controls an audio amplifier $20_2$ and a motor control circuit $20_3$ according to the timing signal P2 and information provided from push button means (shown in FIG. 3). For example, it effects muting on-off control and recording/playback switching control of the audio amplifier $20_2$ and r.p.m. control and rotational direction switching control of the motor control circuit $20_3$. The timing signal P2 is utilized when effecting zero stop, memory stop, auto-stop, before-end alarm, auto-reverse and auto-repeat.

The motor control circuit $20_1$ may also be constructed with a microcomputer similar to that of the controller $14_2$. Also, Speed Regulator IC model TCA955 of Siemens Co. in West Germany may be used as the motor control circuit $20_3$.

The control circuit $20_1$, audio amplifier $20_2$ and motor control circuit $20_3$ are furnished with power from a second battery 22 through a main switch S2. As the second battery 22 a manganese battery or an alkaline battery is usually used. The supply voltage V2 of the second battery 22 is higher than the supply voltage V1 of the first battery 18. The voltage V2 is thus voltage-divided or reduced to the voltage V1 through a voltage regulator $20_4$ consisting of a resistor R20 and a zener diode D20. The reduced voltage V1 from the regulator $20_4$ is coupled to a contact b of the switch section 17. The switch 17 may be a mechanical switch which can be switched either manually or in an interlocked relation through an installation of the first battery 18.

The switching of the switch section 17 is effected in the following case. When the first battery 18 is used up so that its electromotive force is reduced, the fact that the first battery 18 is exhausted is displayed on the display panel 16 by such a method as erasing the display of the lower three bits and displaying the symbol "E" in the fourth bit. The mechanism for displaying the battery life can be realized with prior-art techniques used for electronic desk-top calculators, and thus it is not shown in FIG. 1. When the first battery 18 is exhausted, the normal operation of the counter $14_1$ can no longer be obtained. At this time, either the aforementioned timing signal P2 is produced from the comparator 19, or the signal P2 is produced in a wrong timing. When the exhaustion of the first battery 18 is displayed, the switch section 17 is switched from the side of the contact a to the side of the contact b. By so doing, the counter/clock section 14 and comparator 19 are now furnished with power from the voltage regulator $20_4$. In this way, the normal operation can be recovered. In the case when the second battery 22 is used up while the first battery 18 still possesses sufficient stored electricity, only the function of the tape recorder section is stopped, and the counter/clock portion 14 remains in its normal operation state.

In the case where the counter/clock portion 14 in the construction of FIG. 1 is furnished with power from the second battery 22 through the contacts b and c of the switch section 17, the use of the counter/clock section 14 as the clock is practically unfeasible. This is because it is too cumbersome to match time every time the main switch S2 is on-off operated to permit use of the tape recorder section. Thus, it is to be understood that power supply to the counter/clock section 14 by switching the switch section 17 is made only temporarily.

Figure 3:
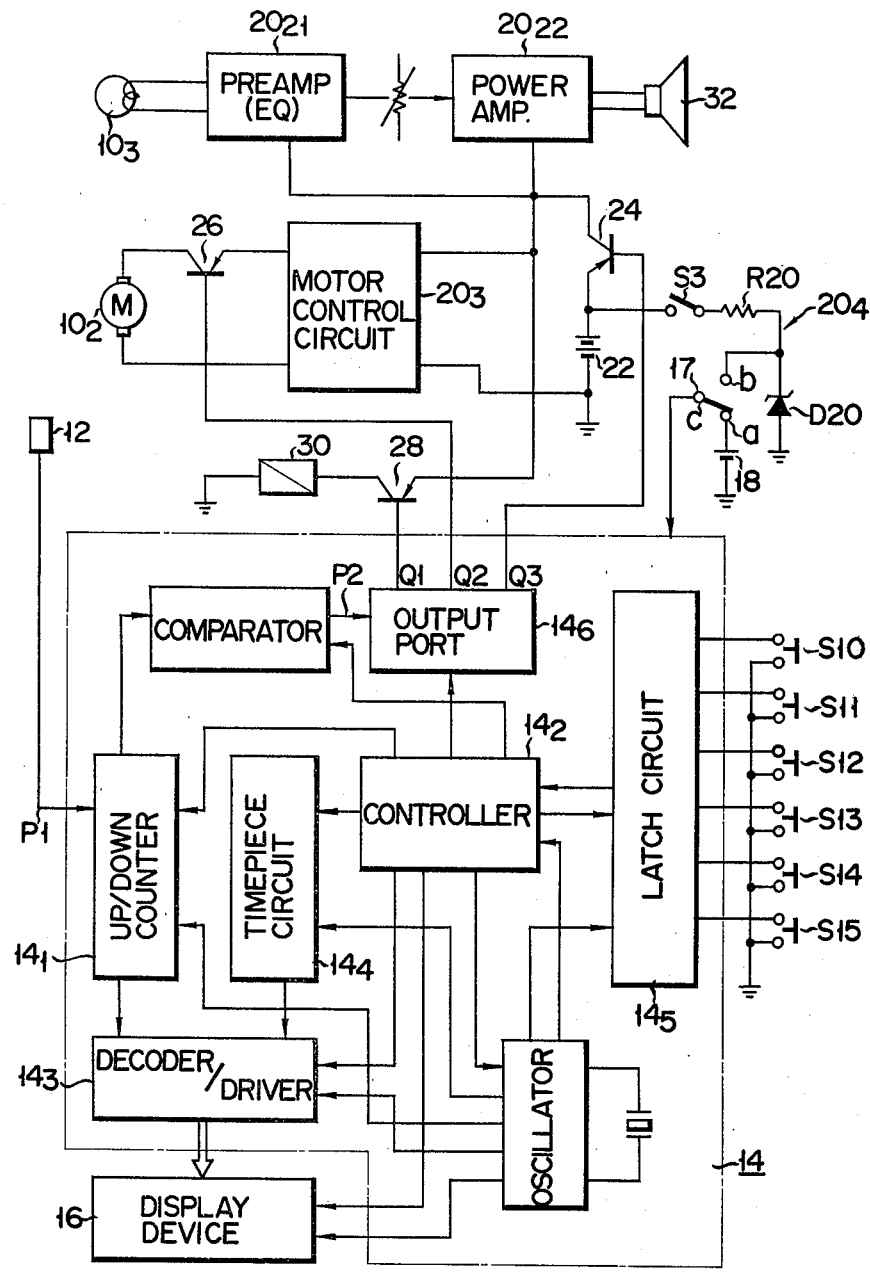
FIG. 3 is a schematic representation of the circuit of another embodiment of the invention.

FIG. 3 shows a modification of the construction shown in FIG. 1. Here push button switches S10 to S15 for controlling the tape transport mechanism 10 shown in FIG. 1 are provided. For example, these switches may be provided respectively for the stop, playback, recording, rewind, clock/counter switching and memory. When the switch S11 for playback, for instance, is turned "on," a playback command is memorized in a latch circuit $14_5$. This playback command is coupled through a controller $14_2$ to an output port $14_6$, whereupon PNP transistors 24, 26 and 28 connected thereto are turned-on or triggered. With the triggering of the transistor 24 a pre-amplifier $20_{21}$ and a power amplifier $20_{22}$ are rendered operative. With the triggering of the transistor 26 a motor $10_2$ is energized. With the triggering of the transistor 28 a solenoid 30 connected to the collector of the transistor 28 is energized. As a result, a head $10_3$ is brought into contact with a recording tape $10_4$ as shown in FIG. 1, and the tape $10_4$ is driven by a capstan $10_5$ with a pinch roller $10_6$ which are coupled to the motor $10_2$ for reproducing recorded sound from a loudspeaker 32.

When the first battery 18 is used up so that the bias supplied from the output port $14_6$ to the transistors 24, 26 and 28 are insufficient, it is no longer possible to have the transistors 24, 26 and 28 "on." At this time, normal power supply to the counter/clock portion 14 can be obtained again by switching the contactor of the switch section 17 to the side of the contact b and also closing a switch S3.

Figure 4:
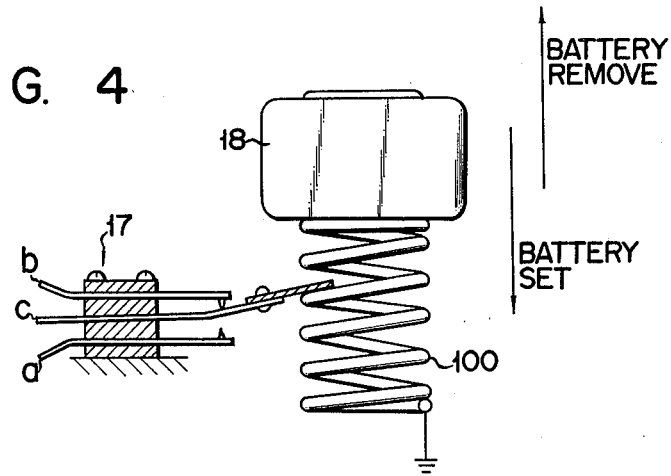
FIG. 4 is a view showing a construction, with which the switch 17 shown in FIG. 3 is switched with the removal or installation of the first battery 18.

FIG. 4 shows a construction, with which the switch 17 shown in FIGS. 1 or 3 is switched with the removal or installation of the first battery 18. With this construction, by taking out the battery 18 from a case (not shown) of the tape recorder when the battery is used up, elongation of a negative pole contact spring 100 is caused to bring the contactor c of the switch 17 to contact with the contact piece b. As a result, the counter portion 14 is furnished with power from the voltage regulator $20_4$. On the other hand, by setting a new battery 18 in the tape recorder the spring 100 is compressed, thus bringing the contactor c of the switch 17 to contact with the contact piece a. As a result, the counter portion 14 is furnished with power from the new battery 18.

The individual component circuits shown by the respective blocks in FIGS. 1 and 3 may have well-known circuit constructions, so their detailed description is not given. In either case of FIGS. 1 or 3, it is sufficient to understand how the switch section 17 is connected to the counter/clock portion 14 or to the tape recorder portion 20 and how the current supply path is changed with the switching of the switch section 17.

As has been described in the foregoing, by the provision of the switch section 17, it is possible to overcome the problem that the operation of the tape recorder section 20 is interrupted by the exhaustion of the first battery 18.

Although specific constructions have been illustrated and described herein, it is not intended that the invention be limited to the elements and constructions disclosed. One skilled in the art will recognize that the other particular elements or subconstructions may be used without departing from the scoe and spirit of the invention.

What we claim is:

1. A power supply device for a multifunction tape recorder having a plurality of power sources, comprising:

an electrically operable counter portion;

an electrically operable tape recorder portion comprising a tape drive arrangement, and consuming more power than said counter portion;

a first power source removably installed in said tape recorder and being coupled to said counter portion for normally supplying power to said counter portion, said first power source comprising a first replaceably battery having a given life for operating said counter portion;

contacting means for contacting said first replaceable battery when it is installed in said tape recorder;

a second power source coupled to said tape recorder portion for supplying power to said tape recorder portion, said second power source comprising a second replaceable battery having a limited life shorter than said given life of said first replaceable battery in actual operation of said tape recorder portion; and switch means operable in interlocked relation to the installation of said first replaceable battery, said switch means being coupled to said first and second replaceable batteries, to said counter portion and to said tape recorder portion, and being responsive to removal of said first replaceable battery from said tape recorder for automatically switching over power supply from said second replaceable battery to said counter portion when said first replaceable battery is removed from said tape recorder, and being responsive to installation of a first replaceable battery for automatically switching over power supply from said first replaceable battery to said counter portion.

2. The device of claim 1, wherein said switch means is operatively coupled to said contacting means, said contacting means comprises spring means operatively coupled to said switch means for operating said switch means during expansion and contraction thereof during removal and installation of a first replaceable battery, respectively.

3. The device of claim 1, wherein:

said counter portion includes a tape counter, a timepiece circuit and a liquid crystal display, and consumes very little power;

said tape recorder portion includes a tape transport mechanism and a recording-playback amplifier, and consumes much more power than said counter section; and said switch means comprises a switch and means mechanically connecting said switch means to said first replaceable battery, said mechanical connecting means maintaining said second replaceable battery disconnected from said counter portion as long as said first replaceable battery is received in the tape recorder, and which electrically connects said second replaceable battery to said counter portion when said first replaceable battery is unloaded from the tape recorder.

4. The device of claim 3, wherein said liquid crystal display of said counter portion includes means for displaying the fact that said first replaceable battery is exhausted.

5. The device of claim 1 or 3, wherein said power sources have different rated voltages; and further comprising a voltage regulator coupled between said switch means and said second power source for producing a voltage substantially equal to the rated voltage of said first power source.

* * * * *

UNITED STATES PATENT AND TRADEMARK OFFICE
CERTIFICATE OF CORRECTION

PATENT NO. : 4,345,286

DATED : August 17, 1982

INVENTOR(S) : Katsumi KANAYAMA, et al

It is certified that error appears in the above-identified patent and that said Letters Patent is hereby corrected as shown below:

COLUMN 5 (claim 1), lines 37 and 38, change "replaceably" to

--replaceable--.

Signed and Sealed this

Twenty-sixth Day of October 1982

[SEAL]

Attest:

GERALD J. MOSSINGHOFF

Attesting Officer

Commissioner of Patents and Trademarks